_United States Patent Office_

3,652,649
Patented Mar. 28, 1972

3,652,649
PURIFICATION OF BIS-BETA-HYDROXYETHYL TEREPHTHALATE
Charles Woo and Roger M. Butler, Sarnia, Ontario, Canada, assignors to Esso Research and Engineering Company
No Drawing. Filed June 5, 1967, Ser. No. 643,387
Int. Cl. C07c 69/82
U.S. Cl. 260—475 PR 4 Claims

ABSTRACT OF THE DISCLOSURE

Crude bis-beta-hydroxyethyl terephthalate, useful in the preparation of fibers and films, is purified by dissolving the ester in a solvent, with or without the presence of minor amounts of an organic acid, contacting the solution with an adsorbent and crystallizing purified bis-beta-hydroxyethyl terephthalate from the treated solution.

FIELD OF INVENTION

This invention relates to the purification of bis-beta-hydroxyethyl terephthalate. More particularly, this invention relates to a process for the purification of bis-beta-hydroxyethyl terephthalate comprising contacting the crude compound, dissolved in a suitable solvent, with an adsorbent, recovering the eluted solution, and crystallizing the purified compound from the treated solution. In a preferred embodiment of this invention, the solvent contains minor amounts of an organic acid which greatly improves the solubility of the bis ester in the solvent and ultimately improves the purity of the recovered compound.

PRIOR ART

Bis-beta-hydroxyethyl terephthalate can be polymerized at temperatures of about 200–300° C. under high vacuum, to a polyester which is quite useful in films and fabrics. However, in order to produce a satisfactory polymer, it is important that the monomer be in a particularly pure state. Thus, polymers prepared from impure monomers tend to have a low inherent viscosity, i.e., a low viscosity average molecular weight, and are dark in color. Both factors are deterimental to the sale and use of products made from the polymer. Several methods for purifying bis-beta-hydroxyethyl terephthalate have been proposed, each achieving a moderate amount of success, yet none combining low cost with yields of the monomer from the purification process approaching 100%. The prior art methods are illustrated by U.S. Pats. 3,120,560 relating to crystallization from solvents such as ethylene dichloride; 3,268,575 relating to crystallization from alcoholic solvents; 3,239,556 relating to the treatment of aqueous solutions with bisulfites and crystallization from the resulting solution.

While it is not known what the color impurities are, it is believed that these impurities have a pronounced effect on the inherent viscosity of the resulting polymer. Consequently, the preparation of a polymer with high inherent viscosity can be related to a monomer having few, if any, coloring impurities. In general, it is desirable that the monomer exhibit a color of about 50 or less, and preferably about less than 25 on the APHA (American Public Health Association) color scale, also known as the Hazen Platinum-Cobalt Scale. By employing the process of this invention, however, bis-beta-hydroxyethyl terephthalate yields from the crude monomer can be made to approach 100% and a water white ester is produced, which when polymerized results in a polymer of high inherent viscosity and low color.

SUMMARY OF THE INVENTION

In accordance with this invention, therefore, bis-beta-hydroxyethyl terephthalate, can be purified by dissolving the ester in a suitable solvent, i.e., one having relatively high solubility for the ester at elevated temperatures, contacting the solution with an adsorbent, and crystallizing the purified ester from the eluted solution. In a preferred embodiment of this invention, minor amounts, i.e., at least about 1 wt. percent based on solvent, preferably 2–15 wt. percent, more preferably 2–8 wt. percent, still more preferably 2–6 wt. percent of an organic acid is added to the solvent. The addition of the organic acid allows a significant decrease in solvent requirement and an increase in color stability of the monomer.

The bis-beta-hydroxyethyl terephthalate which is purified by the present process can be prepared in a variety of ways. However, the method of preparation is not critical to the purification process. Thus, for example, bis-beta-hydroxyethyl terephthalate may be prepared by any of the following methods which are well known to those skilled in the art: reacting terephthalonitrile with ethylene glycol and water in the presence of a catalyst in a manner similar to that shown in British Pat. 981,703 (a preferred method); by an ester interchange reaction of dimethyl terephthalate with ethylene glycol and a catalyst; direct esterification of terephthalic acid with ethylene glycol; reaction of the disodium salt of terephthalic acid with ethylene chlorohydrin; or reacting an aqueous suspension of terephthalic acid with ethylene oxide in the presence of an alkaline catalyst. In all of these processes, the bis ester product contains some reactants and/or impurities which are formed by incomplete reaction of the reactants or by side reactions. For example, in the process in which the bis ester is formed by reacting terephthalonitrile with ethylene glycol and water, the reaction product can be contaminated with unreacted and/or incompletely reacted, i.e., the half ester of terephthalonitrile, low molecular weight polymers of ethylene glycol and/or polyesters. Further, in some of the reactions shown above mono-beta-hydroxyethyl ester of terephthalic acid is formed. The half ester can normally be removed by filtration since it is only partly soluble in the solvents employed in this invention. The filtration would usually be conducted prior to the contacting of the solution of bis ester with the adsorbent, although this is not an essential requirement.

While the process of the present invention is not limited by the concentration of the bis ester in the solvent, it is normally conducted by preparing a 3 to 20 wt. percent solution of the crude bis ester in a suitable solvent at temperatures of about 25 to 60° C. Preferably, however, the solution is a 10 to 20 wt. percent solution and temperatures are 50 to 60° C. The solution is then contacted with an adsorbent. Generally, any system known in the art for contacting a liquid with a divided solid may be used to carry out this process. The inorganic adsorbent should preferably be of a particle size ranging from about 16 to 300 mesh, more preferably 60 to 100 mesh.

For example, the contacting can be carried out by percolating the solution through a tower packed with granular adsorbent of about 30 to 100 mesh or by slurrying the solution with finely divided adsorbent and filtering. In either case, more than one stage can be employed with fresh adsorbent being used in the last stage and gradually transferred to the early stages, thus increasing the quantity of material treated per unit of adsorbent. The time of contact is not critical but should be sufficient to remove a substantial amount of impurities. Generally, however, contact periods of a least about 15 seconds, preferably 1 to 20 minutes, and more preferably 2 to 8 minutes may be employed.

The solvents generally applicable for use in this invention may be characterized as those that will dissolve substantial amounts of the bis-beta-hydroxyethyl terephthalate at the above-mentioned temperatures, that is, the solvent should display at least enough solubility to form the weight percent solutions mentioned. A wide variety of solvents are capable of showing the degree of solubility such as: water; $C_1$-$C_{10}$ alcohols, e.g., methanol, ethanol, propanol, isopropanol; glycols, e.g., ethylene glycol; ethylene dichloride; low boiling ketones, e.g., methylethyl ketone, methylisobutyl ketone, acetone, 3-hexanone, 2- and 3-pentanones; chloroform; organic acids such as monocarboxylic acids having from 1–10 carbon atoms and halosubstituted derivatives thereof, e.g., acetic, formic, propionic, butyric, trichloroacetic, monochloroacetic; lower boiling esters, e.g., acetates, formates, propionates; mixtures of the foregoing and the like. Of these, the organic acids, particularly acetic acid and chloroform are particularly preferred, the latter being most particularly preferred, the latter being most particularly preferred.

An essential part of the invention is the use of an adsorbent. While the selection of the adsorbent is not necessarily critical, it has been found that several adsorbents yield better results than other adsorbents. Typical examples of adsorbents that can be employed are: alumina and related materials, e.g., colloidal alumina; charcoals and other carbonaceous materials, e.g., bone char, animal charcoal, coconut charcoal, activated charcoals; clays and related substances, e.g., attapulgas clay, bentonite, montmorillonite; diatomaceous earths, fullers earth; ion exchange resins, e.g., sulfonic acid resins, phenolic ion exchange resins; zeolites; silicas and silica gels, including synthetic magnesium silicate; filtrol which is an acid activated clay containing mostly silica and alumina and minor amounts of the oxides of iron, magnesium and calcium; florex which is a base activated attapulgite type clay, and the like. One skilled in the art will readily appreciate that both acid and base activated clays are equally applicable for this invention. Particularly preferred adsorbents are colloidal alumina; magnesium silicate; attapulgite clays, e.g., florex; and charcoals. Still more particularly preferred are the inorganic adsorbents such as the magnesium silicates, and the attapulgite type clay, and the like. One skilled in the art may also be used.

In one embodiment of this invention, it has been found these adsorbents may be activated by a heat treatment, the conditions of which are not critical. This activation step is believed to remove water from the material and regenerate the adsorbent or make it more active, e.g., by increasing the surface area. Whatever the mechanism, however, the activation is simply effected by heating the adsorbent to at least about 100° C., preferably 200° C., more preferably at least about 250° C.–300° C., and still more preferably about 550° C.–650° C. The heating is continued for a period of time sufficient to activate the adsorbent, normally about 2 to 15 hours, preferably 3 to 6 hours.

The surface area of the adsorbent is also not critical but should normally be relatively high, e.g., above about 100 m.²/gm., preferably about 100–400 m²./gm.

The treated solution may be recovered in a variety of ways, e.g., filtration, as effluent from a tower, etc., and is cooled to recrystallize the purified bis ester. One skilled in the art will readily determine the optimum conditions for each particular solvent and/or adsorbent. Thus, in some instances it may be advisable to allow the solution to cool while percolating through the adsorbent or conversely to maintain the temperature of the solution throughout the adsorbent and cool only after recovery of the effluent. Such conditions may depend on the solubility of the bis ester in the particular solvent, the latter condition being utilized when cooling through the adsorbent could perhaps cause some precipitation of the bis ester in the bed.

The treated solution is generally cooled to about room temperature, i.e., 18–25° C. Nevertheless, cooling below room temperature will normally increase the yield of product, i.e., the lower the cooling temperature, the greater the yield due to reduced solubility of the bis ester in the solvents. Thus, the solution is preferably cooled to about 10° C. or less, more preferably about 0° C. or less. Clearly, where refrigeration facilities are available, it will be advisable to employ same. Nevertheless, for most purification processes, cooling to room temperature will be sufficient.

The purified recrystallized ester is then separated from the solution, e.g., by filtration, centrifugation, etc., and preferably washed thoroughly with fresh solvent, dried, and a pure product which yields water white polymers is recovered. If desired, the product may be recrystallized from fresh solvent one or more times to further purify the bis ester, preferably 1–2 times.

PREFERRED EMBODIMENT

In a preferred embodiment of this invention, minor amounts of an organic acid are added to the solvent selected for use. While the reaction mechanism is not yet understood, the presence of the organic acid significantly enhances the solubility of the bis ester product and also enhances the color stability of the bis ester. The organic acids that can be employed are the $C_1$-$C_{10}$ monocarboxylic acids and halosubstituted derivatives thereof previously mentioned, e.g., acetic, formic, butyric, propionic, valeric, trichloroacetic, monochloroacetic, etc. Preferred acids are the $C_1$-$C_5$ acids, particularly acetic and formic acids. These acids are normally used in small amounts, e.g., at least about 1 wt. percent based on solvent, preferably 2–15 wt. percent, more preferably about 2–8 wt. percent, and still more preferably 2–6 wt. percent.

Having now described the invention, the following examples will further illustrate the inventive process. Nevertheless, no limitations, except those in the claims appended hereto, are to be implied, since variations of these examples will be obvious to those skilled in the art.

Example 1

A mixture of terephthalonitrile (25 gm.), water (7.2 gm.), ethylene glycol (125 gm.) and cobaltous chloride hexahydrate (0.5 gm.) in a 2-necked flask equipped with a condenser and an inlet tube was refluxed while nitrogen was passed through it. After 2 hours, 90% of the theoretical ammonia was liberated as indicated by titration with standard acid, water (100 gm.) was added to the reaction mixture. The bis-beta-hydroxyethyl terephthalate precipitated upon cooling the reaction mixture was filtered and washed with water. Upon drying bis-beta-hydroxyethyl terephthalate (38 gm.), M.P. 106–110° C., was recovered. When the bis-beta-hydroxyethyl terephthalate was recrystallized from chloroform, it had a melting point of 109–110° C.

Example 2

Chloroform (100 gm.) in a large test tube equipped with a calibrated thermometer and a stirrer was immersed in a water bath. The bath was cooled to 15° C. by the addition of ice and the amount of bis-beta-hydroxyethyl terephthalate required to saturate the chloroform was recorded. The temperature was raised to 20° C. to completely dissolve the bis-beta-hydroxyethyl terephthalate. After complete dissolution had occurred, the temperature was gradually lowered and the temperature $t_1$ for the first crystallization was recorded. The temperature was gradually raised again and the temperature $t_2$ for the first complete dissolution was recorded, stirring being continued throughout. The average of $t_1$ and $t_2$ was taken as the temperature at which that weight of bis-beta-hydroxyethyl terephthalate is required to saturate 100 gm. of chloroform. Then the temperature of the water bath was raised again, more bis-beta-hydroxyethyl terephthalate was dissolved in the chloroform, and the total amount of bis-beta-hydroxyethyl terephthalate required to saturate the chloroform at several higher temperatures was determined. The solubility of bis-beta-hydroxyethyl terephthalate in 4 wt. percent acetic acid-chloroform was similarly measured. The solubilities are shown in Table I.

Example 3

A glass column, approximately 47 cm. high and 1 cm. in diameter, was filled with attapulgus clay, washed with chloroform, and heated to 56° C. by an electric heating tape. A 7% solution of bis-beta-hydroxyethyl terephthalate in chloroform at 56° C. was percolated through the column. The bis-beta-hydroxyethyl terephthalate crystallized from the effluent upon cooling was filtered, washed thoroughly with fresh solvent, and dried.

Similarly, a 7% solution of bis-beta-hydroxyethyl terephthalate in chloroform at 56° C. was percolated through Baymal alumina[1] and Florisil[2] and the purified BHT isolated from the effluent upon cooling. The improvements of the BHT after adsorption treatment is given in Table II.

Example 4

Bis-beta-hydroxyethyl terephthalate (20 gm.) obtained by recrystallization of the crude material from chloroform was subjected to polymerization at 275° C. under vacuum for 3 hours in the presence of calcium acetate (25 m. gm.) and antimony trioxide (6 m. gm.). The polymer thus obtained had an inherent viscosity of 0.3. This result is illustrative of purification as shown in Example 1.

Similarly, polymerization of bis-beta-hydroxyethyl terephthalate obtained after adsorption treatment yielded polymer with high viscosities and possessing cold-drawing properties. The viscosity data are listed in Table II.

TABLE I
Solubility of bis-beta-hydroxyethyl terephthalate

| Solvent | Temperature, °C. | Solubility, gm./100 gm. solvent |
|---|---|---|
| Chloroform | 15 | 0.46 |
| | 27 | 0.49 |
| | 34 | 0.50 |
| | 41 | 0.57 |
| | 52 | 3.28 |
| | 58 | 7.16 |
| 4 wt. percent acetic acid-chloroform | 26 | 3.00 |
| | 37 | 5.20 |
| | 44 | 7.20 |
| | 48 | 9.20 |
| | 52 | 13.20 |
| | 56 | 17.20 |

TABLE II
Effect of adsorption on product quality

| Adsorbent | Eluent | BHT,[1] M.P. °C. | BHT,[1] color | BHT,[1] percent N | Polymer inherent viscosity |
|---|---|---|---|---|---|
| None | Chloroform | 109-110 | Yellowish | 0.14 | 0.3 |
| Attapulgus clay | do | 109-110 | White | 0.11 | 0.5 |
| Colloidal alumina (Baymal) | do | 109-110 | do | 0.026 | 0.7 |
| Magnesium silicate (Florisil) | do | 109-110 | do | (²) | 0.8 |

[1] Bis-beta-hydroxyethyl terephthalate.
[2] Not detectable.

It is noted from Table II that the melting point of the bis ester is the same when treated with any of the adsorbents, or with no adsorbent, yet the color of the bis ester markedly improved when the adsorbent is employed. It is also noticed that the inherent viscosity of the polymer formed from the bis ester increases with decreasing nitrogen content. The nitrogen may come from nitrile compounds introduced into the bis ester when it is prepared from terephthalonitrile or the nitrogen may come from dissolved air during the treatment of the bis ester. Regardless of the source of the nitrogen, Table II illustrates that polymer inherent viscosity is apparently dependent, to a great extent, upon the nitrogen content of the monomer.

Table III below illustrates the effect of acetic acid on the color stability of the bis ester.

TABLE III
Effect of acetic acid on the adsorption crystallization process through magnesium silicate (Florisil)

| Wt. percent of acetic acid in chloroform | | Color stability of BHT at 195° C., Hazen units at— | |
|---|---|---|---|
| | | 0 hr. | 4 hr. |
| 0 | Recrystallization without adsorption | 225 | 500 |
| 0 | Recrystallization with adsorption | 5 | 265 |
| 1 | do | 50 | 130 |
| 2 | do | 40 | 45 |
| 4 | do | 25 | 40 |
| 8 | do | 25 | 60 |
| 15 | do | 25 | 45 |

This table illustrates the good color obtained initially without acetic acid. However, the color quickly degrades. The addition of acetic acid to the solvent sharply reduces color formation and exhibits definite color stabilizing tendencies.

The addiion of acetic acid apparently modifies the nature of the BHT crystals so that they are more readily washed and thus purified. This is shown by a repetition of the second experiment in the above table in which no acetic acid was added but in which three times the quantity of wash solvent was employed. This gave an initial color of 10 Hazen units and a color after 4 hours at 195° C. of 60 units. This result is equivalent to that obtained with the acetic acid containing solvents but far more wash liquid was required.

Table IV below illustrates the preparation of polyesters made from dimethyl terephthalate (DMT) and purified bis-beta-hydroxyethyl terephthalate (BHT).

TABLE IV
Comparison of polyester made from DMT and BHT

| Source | Catalysts | Transesterification time, hours | Polymerization time, hours | Polymer Inherent viscosity | Polymer Color |
|---|---|---|---|---|---|
| DMT | Ca(OAc)₂+Sb₂O₃ | 3.0 | 3.0 | 0.45 | White |
| BHT | Sb₂O₃ | 0.0 | 1.5 | 0.72 | Do. |

In experiments similar to that shown in Example 4 additional adsorbents and various other organic acids dissolved in chloroform were investigated for their applicability to this invention. The results are shown in Tables V-VIII below.

TABLE V
Effect of added organic acids in purification of BHT dissolved in chloroform and adsorbed by Florisil

| Additive | Wt. percent | Color[1] 0 hours | Color[1] 4 hours |
|---|---|---|---|
| Acetic acid | 4 | 25 | 40 |
| Propionic acid | 4 | 20 | 45 |
| Monochloroacetic acid | 4 | 45 | 60 |
| Trichloroacetic acid | 4 | 80 | 120 |
| Formic acid | 1 | 20 | 60 |
| Do | 2 | 15 | 40 |
| Do | 4 | 5 | 10 |
| Do | 6 | 5 | 15 |

[1] Measured as Hazen units at 195° C.

This table shows that formic acid and acetic acid are preferred additives while propionic and monochloroacetic are only slightly less preferred. It would also appear that the degree of acidity is not a particularly important factor since trichloroacetic acid, a strong acid relatively, performs somewhat worse than weaker acids. Thus, the important factor is believed to be the solubility of the bis ester in the solvent.

[1] Baymal alumina is a colloidal alumina of 83% Al₂O₃, 9.9% acetic acid, 1.7% sulfate, 5% water, obtained from E. I. du Pont de Nemours and Co., Wilmington, Del.
[2] Florisil is a synthetic magnesium silicate obtained from the Floridin Co., Tallahassee, Fla.

TABLE VI
Evaluation of adsorbents with chloroform containing 4 wt. percent formic acid

| Adsorbent | Activation temp., °C. at 15 hours | Color stability at 195° C., Hazen units at— | |
|---|---|---|---|
| | | 0 hours | 4 hours |
| Florisil | None | 5 | 10 |
| Attapulgus clay | None | 20 | 185 |
| Do | 300 | 10 | 175 |
| Do | 600 | 45 | 90 |
| Florex [1] (AA-LVM) | None | 40 | 80 |
| Do [1] | 300 | 20 | 460 |
| Do [1] | 600 | 50 | 75 |
| Coconut charcoal | None | 60 | 80 |
| Do | 300 | 50 | 80 |
| Filtrol [2] | None | 50 | 260 |
| Do [2] | 300 | 65 | 140 |
| Do [2] | 600 | 40 | 50 |

[1] A base activated attapulgus clay obtained from Floridin Co.
[2] Obtained from Filtrol Corp. (a silica-alumina product).

The results of these tests show that the higher activation temperatures aid color stability after several hours.

TABLE VII
Evaluation of adsorbents with chloroform containing 4 wt. percent glacial acetic acid

| Adsorbent | Activation temp., °C. at 15 hours | Color stability at 195° C. in Hazen units at— | |
|---|---|---|---|
| | | 0 hours | 4 hours |
| Florisil | None | 25 | 40 |
| Attapulgus clay | None | 25 | 500 |
| Do | 600 | 40 | 60 |
| Florex | None | 80 | 505 |
| Do | 600 | 30 | 60 |
| Coconut charcoal | None | 30 | 95 |
| Filtrol | None | 45 | 500 |
| Do | 600 | 50 | 75 |

This table also shows that activation at high temperatures, particularly in the case of attapulgus clays, florex and Filtrol, is especially advantageous.

TABLE VIII
Evaluation of adsorbents with chloroform containing 4 wt. percent propionic acid

| Adsorbent | Activation temp., °C. at 15 hours | Color stability at 195° C. in Hazen units at— | |
|---|---|---|---|
| | | 0 hours | 4 hours |
| Florisil | None | 20 | 45 |
| Attapulgus clay | None | 20 | 150 |
| Do | 600 | 40 | 60 |
| Florex | None | 45 | 355 |
| Do | 600 | 30 | 50 |
| Coconut charcoal | None | 15 | 50 |
| Filtrol | None | 50 | 500 |
| Do | 600 | 60 | 90 |

This table shows that propionic acid may also be used but it is not as desirable as formic acid or acetic acid.

What is claimed is:

1. A process for the purification of crude bis-beta-hydroxyethyl terephthalate, said terephthalate having been prepared by reacting terephthalonitrile, ethylene glycol and water in the presence of a catalyst, which comprises dissolving the bis ester in chloroform which contains about 2 to 8 weight percent based on chloroform of a $C_1$ to $C_5$ monocarboxylic acid, selected from the group consisting of acetic, formic, butyric, propionic, valeric, trichloroacetic and monochloroacetic, to form a 3 to 20 weight percent solution, contacting the solution with an adsorbent selected from the group consisting of aluminas, charcoals, clays, ion-exchange resins, zeolites, silicas, and silica gels, recovering the effluent and recrystallizing purified bis ester therefrom.

2. A process for the purification of crude bis-beta-hydroxyethyl terephthalate, said terephthalate having been prepared by reacting terephthalonitrile, ethylene glycol and water in the presence of a catalyst, which comprises dissolving the bis ester in chloroform which contains about 2 to 8 weight percent based on chloroform of a $C_1$ to $C_5$ monocarboxylic acid, selected from the group consisting of acetic, formic butyric, propionic, valeric, trichloroacetic and monochloroacetic, to form a 3 to 20 weight percent solution, contacting the solution with an adsorbent selected from the group consisting of colloidal alumina, magnesium silicate, attapulgus clays and charcoals, recovering the effluent and recrystallizing purified bis ester therefrom.

3. The process of claim 2 wherein the monocarboxylic acid is acetic acid and the adsorbent is magnesium silicate.

4. The process of claim 2 wherein the monocarboxylic acid is formic acid and the adsorbent is magnesium silicate.

References Cited
UNITED STATES PATENTS

| | | | |
|---|---|---|---|
| 2,855,432 | 10/1958 | Binder | 260—475 |
| 3,120,560 | 2/1964 | Keck | 260—475 |
| 3,239,556 | 3/1966 | Slockett | 260—475 |
| 3,268,575 | 8/1966 | Keck | 260—475 |
| 3,378,577 | 4/1968 | Tsutsumi | 260—475 |
| 3,439,020 | 4/1969 | Kitabatake et al. | 260—475 |

OTHER REFERENCES

Weissberger, Techniques in Org. Chem., vol. V, pp. 177, 185, 188, 192–195, 205, 206 (1951), QD 251 W44, LORRAINE A. WEINBERGER, Primary Examiner E. J. SKELLY, Assistant Examiner